Dec. 7, 1948. R. D. SHAW 2,455,882
AUTOMATIC DUPLICATING MACHINE
Filed Jan. 28, 1944 3 Sheets-Sheet 1
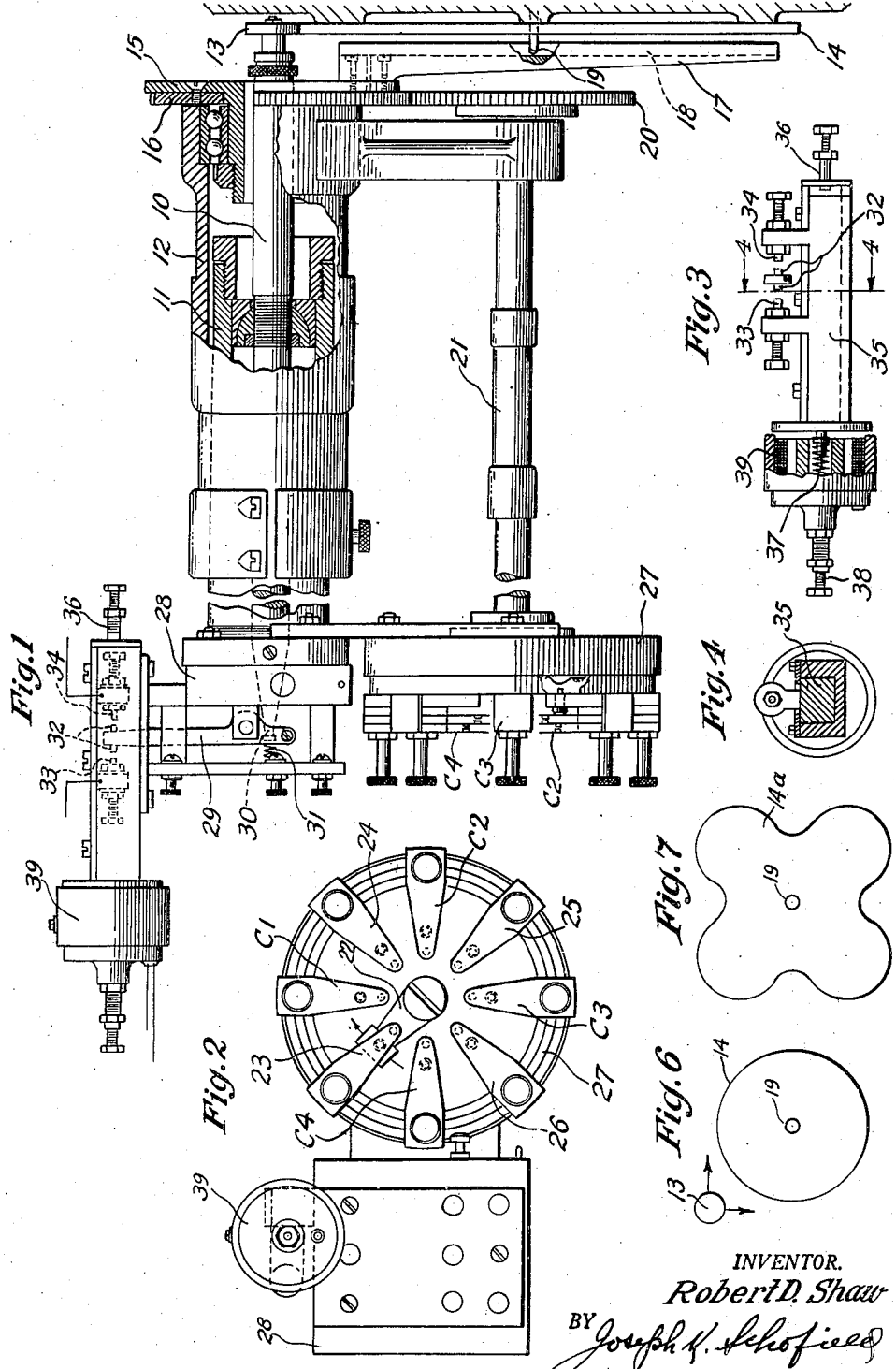
INVENTOR.
Robert D. Shaw
BY Joseph K. Schofield
ATTORNEY Dec. 7, 1948.   R. D. SHAW   2,455,882
AUTOMATIC DUPLICATING MACHINE
Filed Jan. 28, 1944   3 Sheets-Sheet 2

INVENTOR.
Robert D. Shaw
BY
Joseph K. Schofield
ATTORNEY

Dec. 7, 1948.     R. D. SHAW     2,455,882
AUTOMATIC DUPLICATING MACHINE
Filed Jan. 28, 1944     3 Sheets-Sheet 3

INVENTOR.
Robert D. Shaw
BY
ATTORNEY

Patented Dec. 7, 1948

2,455,882

UNITED STATES PATENT OFFICE 2,455,882

AUTOMATIC DUPLICATING MACHINE

Robert D. Shaw, Bloomfield, Conn., assignor to Niles-Bement-Pond Company, West Hartford, Conn., a corporation of New Jersey Application January 28, 1944, Serial No. 520,020

9 Claims. (Cl. 90—62)

This invention relates to duplicating machines and particularly to a fully automatic tracer controlled electrically operated profiling machine, the machine being so designed that a complete outline of any regular or irregular shape may be reproduced by movements of a cutting tool, the path of movement of the tool being controlled electrically by a tracer traversing a template corresponding in outline to the form being reproduced.

Primarily the invention relates to improved control circuits for a machine of the "Keller" type designed to completely cut any shape or outline without manual adjustments of a spring tension member now used for urging the template engaging end of a tracer toward successive portions of the template as the cutting operation progresses.

A primary object of the present invention is to provide a template following tracer which opens and closes contacts in the control circuits for work positioning members of the machine, these contacts being opened and closed by engagement of one end of the tracer with a template mounted adjacent the tracer.

Another object of the invention is to provide a plurality of contacts circularly arranged for controlling movements of the tracer and of the cutter moved thereby, these contacts being closed successively as the tracer traverses different portions of the template being reproduced.

Another object of the invention is to provide a contact shifting mechanism for a contact carrying member associated with the tracer, these contacts being engaged by an opened and closed by movements of the tracer lever as the tracer moves into and out of contact with the template, the member being shifted slightly so that errors caused by the gaps respectively between the contacts on this member and those on the tracer lever may be eliminated.

And finally it is an object to control this contact shifting member electrically by means of contacts opened and closed by a rotatable radial arm rotated in timed relation with movements of the tracer about the template.

Primarily the invention is adapted to produce more efficiently a result similar to that accomplished by the tracer mechanism shown and described in my Patent 1,996,439, granted April 2, 1935, by means of electrical control circuits, these improved circuits being used to control magnetic clutches through control circuits similar to those shown and described in patent to J. C. Shaw 1,683,581, granted September 4, 1928, when effecting profile operations and when provided with the form of tracer shown in Fig. 16 of the drawings for Patent 1,683,581.

With the above and other objects in view the invention consists in the features of construction and operation set forth in the following specification and illustrated in the accompanying drawings.

In the accompanying drawings annexed hereto and forming a part of this specification, I have shown the invention embodied in a tracer controlled machine of the "Keller" automatic profiling type but it will be understood that the invention can be otherwise embodied and that the drawings are not to be construed as defining or limiting the scope of the invention, the claims appended to this specification being relied upon for that purpose.

In the drawings:

Figure 1 is a slide elevation, partly in section, showing a complete tracer provided with the present invention.

Fig. 2 is an end view showing the contact operating end of the tracer.

Fig. 3 is a detail view of the contact shifting means and the electromagnet therefore.

Fig. 4 is a sectional view of the contact shifting means taken on the plane of line 4—4 of Fig. 3.

Fig. 6 is a diagrammatic view showing an assumed starting position of the tracer relative to a circular template.

Fig. 7 is a form of template that may be reproduced by the present invention.

Figure 5:
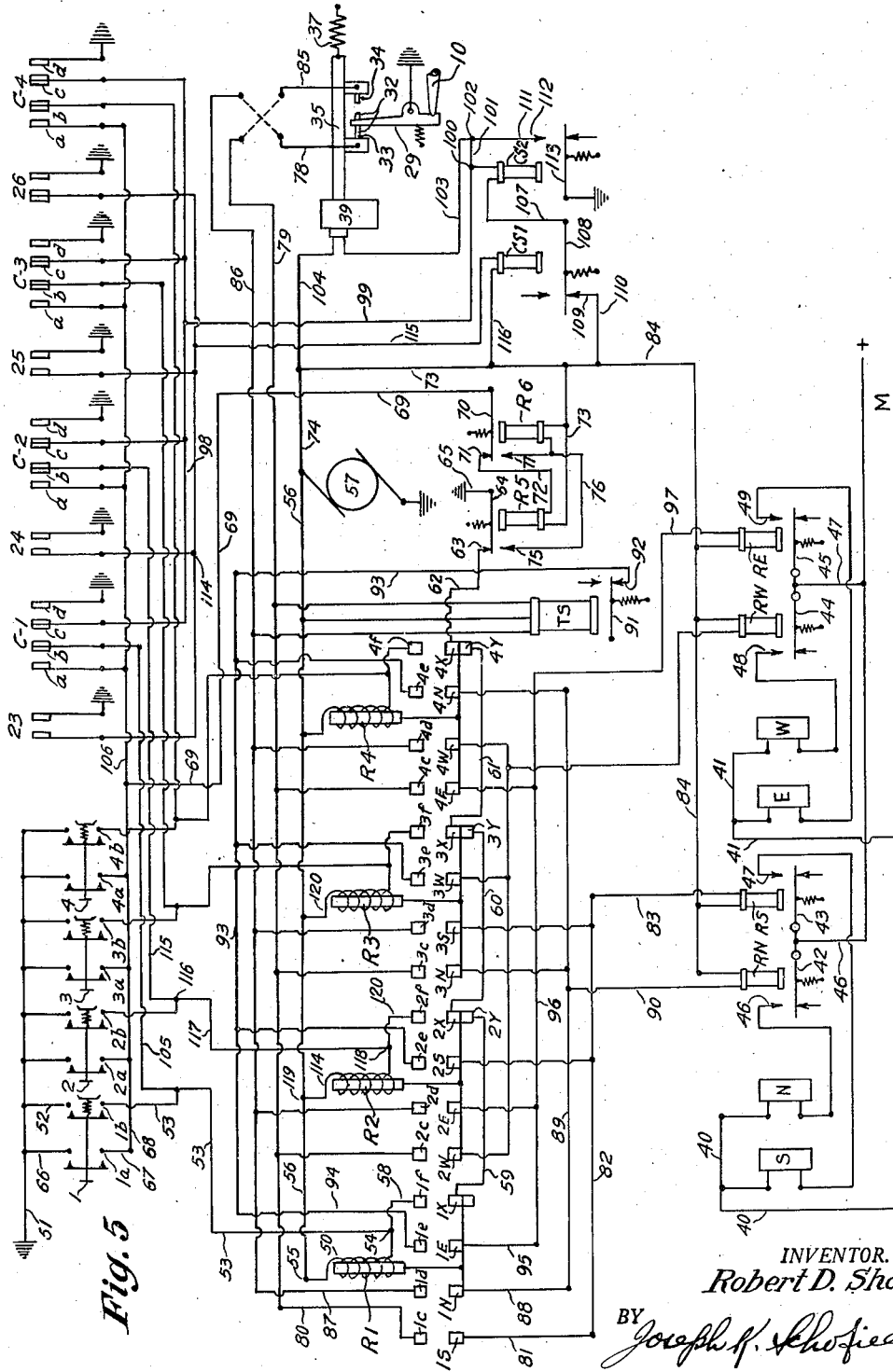
Fig. 5 is a complete diagram of the circuits employed in the present control mechanism.

In the above mentioned drawings there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a tracer actuated contact operating lever, movements of which are effected by engagement and disengagement of the tracer spindle with the template being reproduced; second, a slide member adjacent the tracer lever having adjustable contacts thereon adapted to be engaged respectively by the contacts on said lever; third, means normally urging said slide member in one direction; fourth, electromagnetic means adapted when energized to move said slide member a predetermined limited distance; fifth, an arm extending radially from said tracer and adapted to slidably engage a member outstanding from the template being reproduced; sixth, a rotatably mounted contact closing arm actuated by said radially extending arm; and seventh, groups of circuit controlling contacts for actuating work positioning members successively closed and opened by said rotatably mounted arm.

Referring to Fig. 1 of the drawings, the tracer 10 is pivotally mounted for universal movement intermediate its length in a cylindrical support 11 which is rigidly supported in a hollow tube 12. The tracer 10 at its outer end carries a disc 13 which is adapted to follow the surface of a template 14 having an outline being reproduced by a cutter (not shown) controlled by the tracer. In the following description of the control circuits it is assumed that the periphery of the template 14 is circular. This is assumed for the purpose of simplifying the description of the operation of the mechanism. It is to be understood, however, that any path or outline may be reproduced and that the outline may be an internal or external surface of the template.

Rotatably mounted at the tracer end of the hollow tube 12 is a plate 15 which carries on its inner face a gear 16 and has rigidly mounted on its outer face a radius arm 17 in the outer face of which is a longitudinally extending slot 18 within which engages the end of a fixed pin 19 presently to be more fully defined. Engaging with the gear 16 is a second gear 20 mounted on a shaft 21 extending parallel to the tracer body 12 and carrying on its inner end an arm 22 having a projecting stud which is adapted, as said arm is rotated consequent upon the movement of the tracer disc 13 about the template 14, to successively engage a series of grouped contacts to successively close the contacts of each set or group as it engages them. The series of sets of contacts comprises in the present embodiment a series of four, namely, C1, C2, C3, C4, each set including four contacts a, b, c, and d, shown in Fig. 5, and a series of four intermediate contacts 23, 24, 25 and 26, each of which sets includes two contacts. The sets of contacts are adjustably mounted upon a support 27 which is mounted in fixed relation on the supports 11 and 12 for the tracer 10.

As will be seen in Fig. 1 of the drawings, the pin 19 engaging the slot in the radius arm 17 is positioned approximately at the central portion of the template 14 so that as the disc 13 traverses the template 14 the radius arm 17 is forced to rotate and simultaneously rotate the gear 16 and the shaft 21 together with its contact actuating arm 22.

The tracer support 11 extends from a support 28 for a grounded pivotally mounted contact lever 29 of the usual kind used in Keller machines having at its inner end a concave recess in which engages the rounded end of the tracer 10. The end of the lever 29 is normally pressed against the end of the tracer 10 by an adjustable spring 31. The outer end of the lever 29 carries contacts 32 on opposite faces which are adapted to cooperate respectively with "in" and "out" contacts 33 and 34. These "in" and "out" contacts are mounted according to the present invention on a transversely movable slide 35 which is normally pressed towards the right (as seen in Fig. 1) into engagement with an adjustable stop 36 by the spring 37 (Fig. 3) and is adapted to be drawn toward the left a slight distance against adjustable stop 38 by an electromagnet 39, the energizing of which is effected as will be hereinafter described. In the normal position of the slide 35 and of the tracer lever 29, contact 32 on the lever 29 will be in engagement with the "in" contact 33 so that the machine will operate to advance the tracer 10 toward the template 14 and the cutter 9 toward the work piece 8 shown in Fig. 8.

Figure 8:
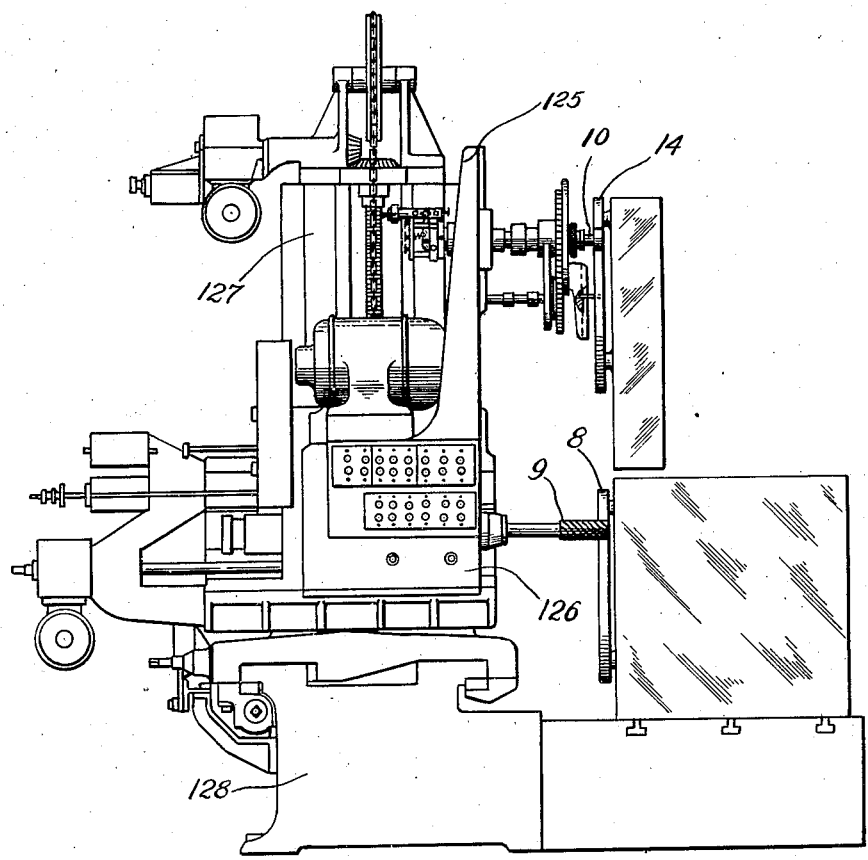
Fig. 8 is an outline drawing in elevation of a machine to which the invention may be applied.
Figure 9:
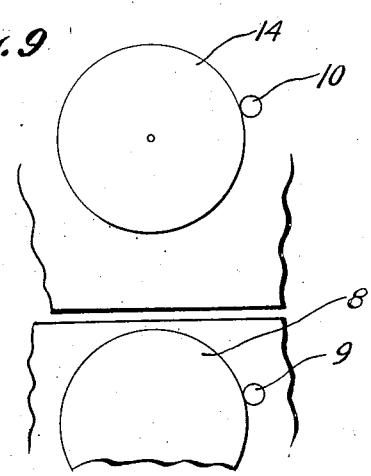
Fig. 9 is a diagram showing relative position of the tracer and cutter to the template and work piece.

The movement of the tracer 10 about the periphery of the template 14 and the movement of the cutter as shown in Fig. 8 are controlled by electromagnets N, S, E and W (Fig. 5) in the usual manner, these magnets being energized respectively by the relays RN, RS, RE and RW. One pole of each of the magnets N and S is connected by wire 40 to the negative side of supply main M while one pole of each of the magnets E and W is connected by wire 41 to the negative side of the main M. Each of the armatures 42, 43, 44 and 45 of the relays RN, RS, RW and RE is connected by wire 46 or a wire 47 to the positive side of the supply main M. The other poles of the magnets N, S, W and E are respectively connected to the stationary contacts 46, 47, 48 and 49 of the relays RN, RS, RE and RW. The energizing, therefore, of any one of the relays RN, RS, RW and RE closes its armature against its cooperating stationary contact and thereby causes the energization, respectively, of one of the electromagnets N, S, E or W.

The control of the operation of said relays to effect the control of the movement of the tracer and of the cutter in conformity with each other is effected by push buttons 1, 2, 3 and 4; relays R1, R2, R3 and R4; sets of contacts C1, C2, C3 and C4; contacts 23, 24, 25 and 26; and contact arm 29 of the tracer.

The push buttons 1, 2, 3 and 4 respectively control two sets of contacts 1a—1b; 2a—2b; 3a—3b; and 4a—4b. The relays R1, R2, R3 and R4 respectively control the engagement with four stationary contacts 1c—1d—1e and 1f; 2c—2d—2e and 2f; 3c—3d—3e and 3f and 4c—4d—4e and 4f of four corresponding movable contacts 1S—1N—1E and 1X; 2W—2E—TS and 2X; 3N—3S—3W and 3X and 4E—4W, 4N and 4X.

*Operation of the control*

Assume that the template 14 is of generally circular form and that the tracer disc 13 is northwest of the template 14 as indicated in Fig. 6. Assume also that contact closing arm 22 is intermediate the set of contacts 23 and the set of contacts C1. The tracer disc 13 must first be brought into contact with the periphery of the template 14. This is effected by the momentary operation of press button 1, which momentarily closes the contacts 1a and the contacts 1b. The closure of the contacts 1b effects the energizing of solenoid 50 of the relay R1 by the closing of a circuit from ground, line 51, line 52, contacts 1b, line 53, junction point 54, solenoid 50, junction point 55, line 56, and generator 57 to ground. Energizing of solenoid 50 engages contacts 1S, 1N, 1E and 1X respectively with contacts 1c, 1d, 1e and 1f whereupon a holding circuit for the solenoid 50 is completed from junction point 54, line 58, contact 1f, contact 1X, line 59, contacts 2Y and 2X of relay R2, line 60, contacts 3Y and 3X of relay R5, line 64, contacts 4Y and 4X of relay R4, line 62, contact 63, armature 64 of relay R5 and line 65 to ground.

The holding circuit is momentarily broken at the contact 63 by the closing of contacts 1a of the aforementioned push switch 1 which completes a circuit through the operating coil of relay R5 from ground, line 51, line 66, contacts 1a, line 67, line 68, line 69, armature 70 of relay R6, contact 71, line 72, operating coil of relay R5, line 73, line 74 and generator 57 to ground. This circuit, however, is immediately broken by the energizing of the operating coil of relay R6 by the circuit from ground, lines 65, armature 64 of relay R5, contact 75, line 76, operating coil of relay R6, line 73, line 74 to generator 57 and ground. The operation of relay R6 breaks the circuit at contact 71 to the operating coil of relay R5 reestablishing the holding circuit for the operating coil 50 of the relay R1 at armature 64 and contact 63 and also establishing a holding circuit for the operating coil of relay R6 through armature 70 and contact 77 which is maintained until such circuit is broken by the release of the push button 1.

The operation of relay R1 closes a circuit through relay RS from ground, tracer lever 29, its contact 32 and "in" contact 33 (which are closed due to action of spring 31), line 78, line 79, line 80, contacts 1c and 1S, line 81, line 82, line 83, operating coil of relay RS, line 84, line 73, and generator 57 to ground. The energizing of relay RS energizes the magnet S in the manner previously indicated starting movement of the tracer disc 13 in a southerly direction towards the template 14. The closing of contacts 1d and 1N has no effect. These contacts would establish a circuit through the operating coil RN from ground, tracer lever 29, contact 32 and "out" contact 34, line 85, line 86, line 87, contacts 1d, 1N, line 88, line 89, line 90, operating coil of relay RN, line 84, line 73, and generator 57 to ground but such circuit is broken at contacts 32, 34 by tracer lever contact 32 being in engagement with "in" contact 33. The closing of contacts 1e and 1E has no effect. These contacts would establish a circuit through the operating coil of relay RE from ground, armature 91 of split table stop relay TS, contact 92, line 93, line 94, contacts 1e, 1E, line 95, line 96, line 97 operating coil of relay RE, line 84, line 73, and generator 57 to ground, but this circuit is broken at armature 91 and contact 92 due to the fact that the operating coil TS is energized by its connection across the active lines 79 and 56, made active as aforesaid through contacts 1c, 1S and contacts 32, 33.

The tracer moves south until the tracer disc 13 engages the template 14. This causes tracer lever 29 to tilt in a direction to open contacts 32, 33 at the tracer arm. This breaks the circuit to the relay RS and also breaks the circuit to the operating coil of relay TS permitting armature 91 to engage the contact 92 completing the circuit to the operating coil of the relay RE as hereinbefore described. The tool and tracer will then travel to the east until the tracer lever 29 is tilted far enough to engage contact 32 and "out" contact 34. This engagement causes the energizing of the operating coil of relay RN through the circuit hereinbefore described which includes the contacts 1c and 1N thereby causing a northward movement of the tracer. One of the operating coils of relay TS is connected across the lines 56 and 86 and this coil will therefore be operated to open the circuit of the operating coil of relay RE at the contact 92 thus stopping the eastward movement of the cutter and tracer. The northward movement of the tracer will relieve the pressure on the tracer disc and the tracer arm 29 will move back to neutral position to deenergize relay RN and energize relay RE. The operating coils of the relays RN and RE will thus be energized in succession, causing a succession of north and east movements of the tracer disc causing it to move upwardly around the template.

When the tracer disc reaches a definite position on the template the arm 22 will close the set of contacts C1. The closing of contacts C—D of this set of contacts completes a circuit for the electromagnet 39 from ground, contacts D—C, line 98, line 99, junction point 100, line 101, junction point 102, line 103, magnet 39, line 104, line 74 and generator 57 to ground. A parallel circuit is also established for the operating coil of contact slide operating relay CS2 from junction point 100 operating coil of relay CS2, line 107, armature 108 of contact slide release, contact 109, line 110, line 73, line 74 and generator 57 to ground. Operation of relay CS2 establishes a holding circuit for the magnet 39 and also for the operating coil of said relay CS2 from junction point 102, line 111, contact 112 and armature 113 of relay CS2 to ground, thus paralleling the ground connection through contacts c and d of the set of contacts C1.

The closing of contacts b—c—d merely makes another connection for coil 50 of the relay R1 to ground from junction point 54, line 53, line 105 and contacts b—c—d to ground providing an extra holding circuit for said coil.

The closing of contacts a—b—c—d breaks the original holding circuit for said coil 50 of the relay R1 at armature 64 of relay R5 and contact 63 by completing a circuit for the operating coil of relay R5 from ground, contacts d—c—b—a, line 106, line 69, armature 70 of relay R6, contact 71, line 72, operating coil of relay R5, line 73, line 74 and generator 57 to ground. Said holding circuit, however, is immediately reestablished by the energizing of the operating coil of relay R6 as previously described.

The establishment of these circuits does not change the direction of movement of the tracer disc but the energizing of coil 39 moves the slide 35 with "in" contact 33 and "out" contact 34 a certain limited distance to the left so that the contacts 32 when the tracer arm 29 is in normal position will be intermediate the contacts 33 and 34. When arm 29 is in neutral position relay RE will be energized and when arm 29 is tilted clockwise to close contacts 32 and 34 relay RN will be energized. The movement of the tracer disc 13 about the periphery of the template continues in a northeasterly direction and the contacts a—b—c—d of the set of contacts will open. This will not effect the operation of the machine since holding circuits independent of said contacts have been provided through armature 113 for the operating coil of the relay CS2 which maintains said armature in circuit completing position.

The northeasterly movement of the tracer disc 13 about the template continues until the disc reaches the north or uppermost position whereupon the arm 22 closes the set of contacts 24. The closing of these contacts energizes the operating coil of the contact slide release relay CS1 by completing a circuit from ground, contacts 24, line 114, line 115, operating coil of said relay CS1, line 116, line 73, line 74 and generator 57 to ground. The energizing of the operating coil of relay CS1 opens the circuit for the operating coil of relay CS2 at armature 108 and contact 109. The de-energizing of the operating coil of relay CS2 opens the holding circuit of the coil 39 at armature 113 and contact 112. Since the contacts c—d of the set of contacts C1 had already been opened by the arm 22 passing them the coil 39 is de-energized and the spring 37 draws the slide 35 and "in" and "out" contacts 33 and 34 to the right, closing the "in" contact 33 with contact 32. The circuit through the operating coil of relay RS is therefore reestablished. Since an operating coil of relay TS is also connected across lines 56 and 79 the circuit of the operating coil RE will be broken at armature 91 and contact 92. The tracer disc will therefore move south until contacts 32—33 are opened by the lever 29 being tilted whereupon the east motion will take over due to the closing of the circuit of the operating coil of relay RE consequent upon the de-energizing of the operating coil TS. Southerly and easterly movements will therefore be successively imparted to the tracer disc 13 about the template first resulting in the opening of the contacts 24 which will have no result (since the circuits for the operating coil of CS2 and of the magnet 39 are open at 112 and c—d) and then resulting in the closing of the contacts a—b—c—d of the set of contacts C2 by the arm 22 when the disc reaches the northeasterly position on the periphery of the template.

The closing of the set of contacts C2 has the following results. The closing of the contacts c—d of said set energizes the magnet 39 through the same circuit as that controlled by the contacts c—d of C1 and also in the same manner energizes the operating coil of relay CS2 establishing holding circuits both for said coil and for the magnet 39 through the armature 113. The slide 35 with the "in" and "out" contacts 33 and 34 is thus moved to the left.

The closing of contacts b—c—d energizes the coil 114 of relay R2 through the circuit from ground, contacts d—c—b of C2, line 115, junction point 116, line 117, junction point 118, coil 114 of relay R2, junction point 119, line 56 and generator 57 to ground.

The closing of contacts a—b—c—d of this series de-energizes the operating coil 50 of the relay R1 by energizing the operating coil R5 through the circuit from ground, contacts d—c—b—a, line 106, line 69, armature 70, contact 71, line 72 operating coil of relay R5, line 73, line 74 and generator 57 to ground. The contacts of relay R1 immediately open and the de-energizing of the operating coil R5 by the energizing of operating coil R6 in the manner hereinbefore described cannot reestablish the circuit of coil 50 since such circuit is broken at contacts 1f and 1X of relay R1. The de-energizing of operating coil R5 does, however, establish a holding circuit of the operating coil 114 of relay R2 from junction point 118 through line 120, contacts 2f and 2X, line 60, contacts 3X and 3Y, line 61, contacts 4X and 4Y, line 62, contact 63, armature 64 and line 65 to ground such circuit paralleling that through the contacts a—b—c—d of C2.

The energizing of operating coil 114 of relay R2 closes the contacts 2W—2E—2S and 2X respectively against contacts 2c—2d—2e and 2f, thereby in addition to establishing the aforesaid holding circuit, connects the operating coils of relays RW and RE respectively to "in" and "out" contacts 33 and 34 of the tracer slide 35 in place of the operating coils RS and RN which were connected to said contacts when the relay R1 was operated. Also the operating coil RS replaces the operating coil RE in being connected to the contact 92 which cooperates with the armature 91 of the relay TS.

If the tracer lever 29 is in neutral position the coil TS will be de-energized and the operating coil RS will be energized resulting in a southerly movement of the tracer disc 13 until the tracer lever 29 is tilted to close contact 32 and "out" contact 34 resulting in the energizing of an operating coil of relay TS and also the energization of operating coil of relay RE, thus producing an easterly movement of the tracer disc. The tracer disc 13 will thus move in a southeasterly direction in successive south and east movements, about the periphery of the template 14. During this movement the set of contacts C2 will be opened but this will have no effect on the operation of the machine due to the holding circuits for operating coil 114, for the magnet 39, and for the operating coil of relay CS2 being closed.

When the tracer disc 13 reaches the east position the contacts 25 will close which will have the same effect as the closing of contacts 24, namely, the energizing of the operating coil of relay CS1 and the consequent opening of the holding circuits of magnet 39 and of the operating coil of relay CS2. The magnet 39 will therefore be de-energized and the spring 37 will move the slide 35 and "in" and "out" contacts 33 and 34 carried thereby to the right. Due to this movement of the slide the relays RW and RS will alternately be operative, thus moving the tracer disc 13 in a southwesterly direction about the template. No change will occur in the operation of the machine when the contacts 25 are opened for the reasons given with respect to the opening of the contacts 24. When the tracer disc 13 reaches its southwesterly position on the template 14 the contacts C3 will be closed resulting in the de-energizing of the operating coil 114 of the relay R2 and the energizing of the operating coil 120 of the relay R3 in the same manner as described with respect to the change over from R1 to R2 upon the closing of the contacts C2 and a holding circuit will be completed for coil 120 through armature 64 of relay R5. Due to the operation of relay R3 the operating coils of relays RN and RS will be respectively connected to the "in" and "out" contacts 33 and 34 of the tracer slide 35 while the operating coil of relay RW will be connected to the contact 92 of the relay TS. Also the magnet 39 will be energized and a holding circuit completed therefor through armature 113.

Due to the slide 35 being in its left-hand position, the operating coil of relay RW will be operative when the tracer lever 29 is in its neutral position and operating coil of relay RS will be operative when the tracer lever 29 is tilted from its neutral position by engagement with the template. Consequently the tracer disc 13 will move about the template 14 in a southwesterly direction. When the contacts C3 open no change will take place in the operation of the machine and the tracer disc will continue its movement until it reaches its south position whereupon contacts 26 will be closed. The closing of these contacts acts in the same way as the closing of the contacts 24 or the closing of the contacts 25 and the magnet 39 is deenergized whereby the slide 35 and the "in" and "out" contacts 33 and 34 are moved to the right by the spring 37. Due to this movement, the operating coils of relays RW and RN are alternately energized depending upon whether the tracer lever 29 is in neutral or tilted position. The tracer disc 13 will therefore move around the template 14 in a northwesterly direction. When the contacts 26 are opened no change will take place in the operation of the machine. When the tracer disc 13 reaches the southwest position the contacts C4 will be closed by the arm 22 resulting in the change over from relay R3 to the relay R4 and the energizing of the magnet 39. Due to this change over the operating coils of the relays RE and RW will be respectively connected to the "in" and "out" contacts 33 and 34 of the tracer slide 35 and the operating coil RN will be connected to the contact 92 of the relay TS. Due to the slide 35 having been moved to the left by the energizing of magnet 39 the operating coils of the relays RW and RN will be alternately operative and the tracer disc 13 will continue its movement about the template in a northwesterly direction. No change will take place in the operation of the machine when the contacts C4 are opened and when the tracer disc reaches its west position on the template the contacts 23 will be closed by the arm 22.

The closing of contacts 23 will, as described with reference to the closing of contacts 24, de-energize magnet 39 permitting spring 37 to move the slide 35 and the "in" and "out" contacts 33 and 34 to the right whereby the tracer lever 29 will alternately cause the energization of the operating coils of the relays RE and RN causing the tracer disc 13 to move around the template in a northeasterly direction until the tracer disc 13 reaches the position where it first contacted the template 12 completing the operation of the machine.

In the above described operation of the machine only the operation of push button 1 has been referred to. If the tracer disc is in position for first contacting the template in the northeast sector the push button 2 would be initially operated resulting in the operation of relay R2 whereupon the relays R3, R4 and R1 would operate in succession to complete the movement of the tracer about the template.

If the tracer disc is in position for first contacting the template in the southeast or the southwest sectors the push buttons 3 and 4 would be respectively operated whereupon the relay R3 or R4 would be operated and the tracer disc then moved around the template by the successive operation of the other relays.

The above description has been based on the assumption that the template 14 was a circle or generally circular in outline. In Fig. 7 is shown an irregular template 14a in which reversals of movement of the tracer disc 13 are required during its movement about the outline being reproduced. In operating on templates of this type requiring reversals of movement at various and differently spaced positions it is necessary to mount the series of groups of contacts C1, C2, C3 and C4 and the intermediate contacts 23, 24, 25 and 26 in their ring 27 at the various points where reversals of movement are required.

As stated previously the invention is adapted for application to the duplicating machine disclosed in patent to J. C. Shaw, 1,683,581. Fig. 8 shows an outline of this machine having the present tracer construction shown in operative position relative to the principal part of the machine.

The tracer 10 and its associated parts are carried by a bracket 125 relative to which the tracer may be vertically adjusted and fixed in position during operation. Bracket 125 is secured to the cutter head 126 vertically movable on the column 127 which is provided with the usual vertical ways for that purpose. Column 127 is movable laterally in a horizontal direction on a base 128. Adjustment of the cutter head with the tracer toward and from the template 14 and work piece 8 is provided by horizontal ways on the column 127. By movement up and down of the cutter head 126 on the column 127 and horizontal transverse movements of the column 127 on the base 128 the tracer 10 and cutter 9 may be made to traverse any outline as called for by the template. At all times during the cutting operation the template and work piece are held in fixed position in the same manner as in the above referred to patent.

What I claim is:

1. A tracer for electrically controlled duplicating machines comprising in combination, a tracer body, a tracer arm therein one end of which is adapted to engage the periphery of a template and the opposite end varies the position of a contact carrying lever when the tracer arm is actuated in any direction, a member mounted adjacent said lever having opposed contacts thereon suitably spaced apart and engageable respectively with the contacts on said lever, and means controlled by movement of said tracer about the template to move said member a limited distance in a direction to open one of its contacts and close the other contact with the contacts on said lever.

2. A tracer for electrically controlled duplicating machines comprising in combination, a tracer body, a tracer arm therein one end of which is adapted to engage the periphery of a template and the opposite end varies the position of a contact carrying lever when the tracer arm is actuated in any direction, a member mounted adjacent said lever having opposed contacts thereon engageable respectively with the contacts on said lever, means normally holding said member in one position, and means to move said member a limited distance periodically during operation of the machine to vary the positions of the contacts carried thereby relative to said lever.

3. A tracer for electrically controlled duplicating machines comprising in combination, a tracer body, a tracer arm therein one end of which is adapted to engage the periphery of a template and the opposite end varies the position of a contact carrying lever when the tracer arm is actuated in any direction, a member mounted adjacent said lever having opposed contacts thereon engageable respectively with the contacts on said lever, spring means normally holding said member in one position, and electromagnetic means to move said member a limited distance during operation of the machine to vary the positions of the contacts carried thereby relative to said lever.

4. A tracer for electrically controlled duplicating machines comprising in combination, a tracer body, a tracer arm therein one end of which is adapted to engage the periphery of a template and the opposite end varies the position of a contact carrying lever when the tracer arm is actuated in any direction, a member mounted adjacent said lever having opposed contacts thereon adjustable toward and from each other and engageable respectively with the contacts on said lever, and means to move said member predetermined adjustable distances during the operation of the machine to vary positions of the contacts carried thereby relative to said lever.

5. A tracer for electrically controlled duplicating machines comprising in combination, a tracer body, a tracer arm therein one end of which is adapted to engage the periphery of a template and the opposite end varies the position of a contact carrying lever when the tracer arm is actuated in any direction, a member mounted adjacent said lever having opposed contacts thereon engageable respectively with the contacts on said lever, means normally holding said member in one position, and electromagnetic means to move said slidable member a predetermined adjustable distance during operation of the machine to vary positions of the contacts carried thereby relative to said lever.

6. A tracer for electrically controlled duplicating machines comprising in combination, a tracer body, a tracer arm therein one end of which is adapted to engage the periphery of a template and the opposite end opens and closes contacts when the tracer arm is actuated in any direction, an arm rotatably mounted on said tracer body engaging a member positioned on said template, a gear mounted for rotary movement with said arm as said tracer traverses said template, a contact closing member actuated by said rotatable gear and arm, a plurality of contacts adjustably mounted on said tracer body adjacent said contact closing member adapted to be successively operated by said contact closing member, and machine controlling circuits opened and closed thereby.

7. A tracer for electrically controlled duplicating machines comprising in combination, a tracer body, a tracer arm therein one end of which is adapted to engage the periphery of a template and the opposite end opens and closes contacts on said tracer body when the tracer arm is actuated in any direction, a radial arm mounted on said tracer body and rotatable about an axis parallel with said tracer body as the tracer traverses the template, said radial arm pivotally engaging a member positioned within said template, a contact closing member actuated by said radial arm, and a plurality of adjustably positioned contacts mounted on said tracer body adjacent said contact closing member adapted to be successively operated thereby, and machine controlling circuits opened and closed thereby.

8. A tracer for electrically controlled duplicating machines comprising in combination, a tracer body, a tracer arm therein one end of which is adapted to engage the periphery of a template and the opposite end opens and closes contacts when the tracer arm is actuated in any direction, an arm rotatably mounted on said tracer body and pivotally engaging a member outstanding from a point within the periphery of said template, a gear mounted for movement with said arm as said tracer traverses said template, a contact closing member rotated by said rotatable gear and arm as said tracer traverses the periphery of said template, a plurality of contacts mounted on said tracer body adjacent said contact closing member in a circular series concentric with the axis of rotation of said contact closing arm, said contacts adapted to be successively operated by said closing member, and machine controlling circuits opened and closed thereby.

9. A tracer for electrically controlled duplicating machines comprising in combination, a tracer body, a tracer arm therein one end of which is adapted to engage the periphery of a template and the opposite end opens and closes contacts when the tracer arm is actuated in any direction, a radial arm mounted on said tracer body, said arm being rotatable about an axis parallel with said tracer body and pivotally engaging a member positioned within said template as said tracer traverses said template, a contact closing member actuated by said rotatable arm, and a plurality of adjustable series of contacts mounted on said tracer body adjacent said contact closer adapted to be successively operated by said closer, and circuits opened and closed by said contacts to traverse said tracer about said template.

ROBERT D. SHAW.

REFERENCES CITED

The following references are of record in the file of this patent:

UNITED STATES PATENTS

| Number | Name | Date |
| --- | --- | --- |
| 1,683,581 | Shaw | Sept. 4, 1928 |
| 1,774,279 | Lochman | Aug. 26, 1930 |
| 1,952,230 | Anderson | Mar. 27, 1934 |
| 1,996,439 | Shaw | Apr. 2, 1935 |
| 2,036,362 | Sassen | Apr. 7, 1936 |
| 2,162,491 | Rosen | June 13, 1939 |
| 2,332,533 | Roehm | Oct. 26, 1943 |
| 2,345,218 | Rosen | Mar. 28, 1944 |
| 2,364,873 | Rosen | Dec. 12, 1944 |

FOREIGN PATENTS

| Number | Country | Date |
| --- | --- | --- |
| 459,685 | Great Britain | Jan. 13, 1937 |
| 505,470 | Great Britain | May 11, 1939 |